United States Patent [19]

Modell

[11] 4,124,528

[45] *Nov. 7, 1978

[54] PROCESS FOR REGENERATING ADSORBENTS WITH SUPERCRITICAL FLUIDS

[75] Inventor: Michael Modell, Cambridge, Mass.

[73] Assignee: Arthur D. Little, Inc., Cambridge, Mass.

[*] Notice: The portion of the term of this patent subsequent to Dec. 6, 1994, has been disclaimed.

[21] Appl. No.: 512,124

[22] Filed: Oct. 4, 1974

[51] Int. Cl.² .......................... B01J 21/20; B01J 1/09; B01D 15/06

[52] U.S. Cl. .................................. 252/411 R; 34/12; 34/36; 210/32; 210/40; 210/186; 210/269; 568/758

[58] Field of Search ............................ 252/411 R, 420; 260/627 R; 208/263; 210/32, 34, 40; 55/74, 75; 203/49; 34/12, 36, 37; 568/758

[56] References Cited

U.S. PATENT DOCUMENTS

| T861,027 | 4/1969 | Long et al. | 208/11 |
|---|---|---|---|
| 1,653,783 | 12/1927 | Robinson et al. | 260/627 R |
| 2,324,467 | 7/1943 | Brandt | 260/627 R |
| 2,343,165 | 2/1944 | Adler | 260/627 R |
| 2,587,425 | 2/1952 | Adams et al. | 252/416 |
| 3,325,971 | 6/1967 | Rosmam | 55/62 |
| 3,558,468 | 1/1971 | Wise | 208/8 |
| 3,575,884 | 4/1971 | Seiler | 260/627 R |
| 3,647,716 | 3/1972 | Koches | 252/421 |
| 3,649,559 | 3/1972 | Cooper | 252/419 |
| 3,801,514 | 4/1974 | Joseph | 252/411 R |
| 3,816,338 | 6/1974 | Corson | 252/420 |
| 3,843,824 | 10/1974 | Roselius et al. | 426/386 |
| 3,923,847 | 12/1975 | Roselius et al. | 260/412.8 |
| 3,939,281 | 2/1976 | Schwengers | 426/429 |
| 3,969,196 | 7/1976 | Zosel | 203/49 |
| 4,061,566 | 12/1977 | Modell | 210/32 |

FOREIGN PATENT DOCUMENTS

| 1,057,911 | 2/1967 | United Kingdom. |
| 1,346,134 | 2/1974 | United Kingdom. |
| 1,400,098 | 7/1975 | United Kingdom. |

*Primary Examiner*—P. E. Konopka
*Attorney, Agent, or Firm*—Bessie A. Lepper

[57] ABSTRACT

An adsorbate is removed from an adsorbent by contacting the adsorbent with a supercritical fluid which is a solvent for the adsorbate. The supercritical fluid containing the dissolved adsorbate is then subjected to a physical treatment which renders the supercritical fluid a nonsolvent for the adsorbate and makes it possible to remove the adsorbate from the supercritical fluid. The supercritical fluid is then subjected to another physical treatment to restore it to a state wherein it is a solvent for the adsorbate so that it may be reused. The process and apparatus are particularly suitable for adsorbent regeneration in the treating of waste water.

24 Claims, 4 Drawing Figures

PROCESS FOR REGENERATING ADSORBENTS WITH SUPERCRITICAL FLUIDS

This invention relates to the regeneration of adsorbents and more particularly to a process and apparatus for desorbing adsorbates from adsorbents by dissolving the adsorbate in an inert solvent maintained in a supercritical condition.

In the purification and removal of impurities from fluid streams in industrial processes an adsorbent is used to adsorb the impurities from a fluid stream. Adsorbents may also be used to separate components in a process. In other processes, unwanted adsorption of materials on catalytic surfaces may take place.

Thus, for example, small amounts of organics, both aliphatic and aromatic, are removed by being adsorbed on activated carbon in the treatment of waste waters from industrial processes. Color bodies are adsorbed in the process of sugar refining and impurities are removed from vinyl chloride streams through adsorption. In the production of urea similar steps are taken to remove impurities from feed stock and product through adsorption. A final example of adsorption may be taken from petroleum cracking processes where high surface area catalytic materials such as alumina, silica or like materials, with or without such metals as nickel, cobalt, molybdenum or tungsten deposited thereon, become contaminated by impurities which are adsorbed on them. In all such cases, the adsorbates must be periodically removed from the adsorbents.

These adsorbents are well known and they may generally be defined as solid phase materials having very high surface area to weight ratios and exhibiting the ability to concentrate adsorbates on their surfaces. Among the more commonly used adsorbents are activated carbon, alumina, silica, and silicates. (See for example Table 16-2 of "Chemical Engineers' Handbook" Robert H. Perry and Cecil H. Chilton, McGraw-Hill, New York, Fifth Edition, 1973, pp 16-5 through 16-9.)

The use of such adsorbents normally includes one or more steps to effect their regeneration, i.e., the removal of all or a part of the adsorbate which has adhered to the surface of the adsorbent. If the adsorbate is a volatile material, such regeneration may be accomplished by heating the adsorbent to volatilize off the adsorbate or by creating a vacuum around the adsorbent. Volatilization with heating may be accompanied by reaction with some added reactant, e.g., oxygen to oxidize adsorbed hydrocarbons. It is, of course, apparent that the less volatile adsorbates require higher temperatures to remove them in this manner and such temperatures may contribute to the gradual thermal degradation of the adsorbent. Moreover, any reactant added, such as oxygen, may chemically degrade the adsorbent, causing loss of usable capacity. Such losses require that the adsorbent be periodically replaced. Finally, the use of high temperatures for adsorbent regeneration requires a relatively high expenditure of energy.

Activated carbon used in removing organic impurities from waste waters may be taken as exemplary of the type of performance now being attained in the use and regeneration of adsorbents. High surface area (1000–1300 m$^2$/g) activated carbon has a high capacity (0.1 to 50g/g) for most organic materials. When used as an adsorbent for treating aqueous solutions, activated carbon is usually regenerated by oxidizing the adsorbed organics with air and/or steam at high temperature, e.g., 500°–700° C. Under such conditions, there is a loss of 3 to 10% of the activated carbon adsorbent for each regeneration resulting from partial oxidation of the activated carbon. Thus, the average lifetime of activated carbon is 10 to 30 regenerations. The adsorbent loss therefore becomes a significant fraction of the total operating cost.

The use of a vacuum to remove adsorbates from an adsorbent requires the equipment necessary to generate the required degree of evacuation and it is a technique which is limited to only certain classes of adsorbates, namely those which exhibit appreciable vapor pressure at temperatures below their decomposition point. That is, many low volatility solids and liquids will decompose before their vapor pressure becomes appreciable.

It would therefore be desirable to have a process and apparatus by which adsorbates could effectively be removed or extracted from their adsorbents more efficiently and with less degradation of the adsorbent.

It is therefore a primary object of this invention to provide an improved process for regenerating adsorbents. It is another object to provide a process of the character described based on the dissolution of adsorbates which efficiently regenerates adsorbents in a manner to minimize adsorbent degradation, whether thermal or chemical, and which likewise minimizes adsorbate degradation, thus allowing potential recovery of a by-product normally lost. Still another object is to provide such a process which is applicable to a wide range of adsorbent/adsorbate combinations.

Another principal object of this invention is to provide an improved process for waste water purification using an adsorbent to remove organic impurities and an inert solvent in the form of a supercritical fluid to extract adsorbates from the adsorbent to regenerate it.

Yet another primary object of this invention is to provide improved apparatus for the regeneration of adsorbents. It is an additional object of this invention to provide apparatus of the character described which uses an inert adsorbate solvent in the form of a supercritical fluid to dissolve off the adsorbate. A further object is to provide a system for waste water treatment embodying the apparatus of this invention.

Other objects of the invention will in part be obvious and will in part be apparent hereinafter.

In the process of this invention, adsorbents are regenerated by extracting adsorbates from their surfaces by dissolving the adsorbates in a chemically inert solvent in the form of a supercritical fluid. The adsorbent, with the adsorbate adhered thereto, is contacted with a suitable supercritical fluid and then the supercritical fluid containing the dissolved adsorbate is subjected to a physical treatment which renders it a nonsolvent for at least a portion of the adsorbate, thus separating the adsorbate and the supercritical fluid into two phases. Subsequent to the separation of the adsorbate from the supercritical fluid, the supercritical fluid, which may be described as being in a nonsolvent state, is subjected to another physical treatment to return it to the condition in which it is a solvent for the adsorbate so that it may be recycled. Thus it may be said to be in a solvent state prior to recycling. The physical treatments may constitute either changing the temperature or changing the pressure on the supercritical fluid. Rendering the supercritical fluid a nonsolvent for the adsorbate will generally be accomplished by increasing the temperature or decreasing the pressure; while reconverting it to a solvent for the adsorbate will generally be accomplished by decreasing the temperature or increasing the pressure. However, in the use of temperature the reverse procedure may be used in some cases i.e., decreasing the temperature to render the supercritical fluid a nonsolvent for the adsorbate and increasing the temperature to render it a solvent. As an optional step, the adsorbate may be reacted with a reactant while dissolved in or mixed with the supercritical fluid.

In a waste water purification system according to this invention, organic impurities are adsorbed on activated carbon and as adsorbates they are dissolved off by a supercritical fluid such as carbon dioxide.

In the following detailed discussion the term "nonsolvent state" is applied to the supercritical fluid to indicate that it has a relatively low solubility for one or more adsorbates; and the term "solvent state" is applied to the supercritical fluid to indicate that it has a relatively high solubility for one or more adsorbates. Thus these terms are not used in the absolute sense, but in the relative sense.

In brief, the apparatus of this invention comprises, in combination, fluid contacting means for contacting an adsorbent having an adsorbate adhered thereto with a supercritical fluid which is a solvent for the adsorbate, means to remove the supercritical fluid containing the adsorbate dissolved therein from the adsorbent, means to subject the supercritical fluid to a physical treatment to separate at least a portion of the adsorbate into a separate phase and means to return the supercritical fluid to a condition in which it is again a solvent for the adsorbate. The apparatus may include optional means to introduce a reactant for the adsorbate dissolved in or mixed with the supercritical fluid. The apparatus of this invention for regenerating adsorbents may be incorporated into a waste water treating system.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which.

Figure 1:
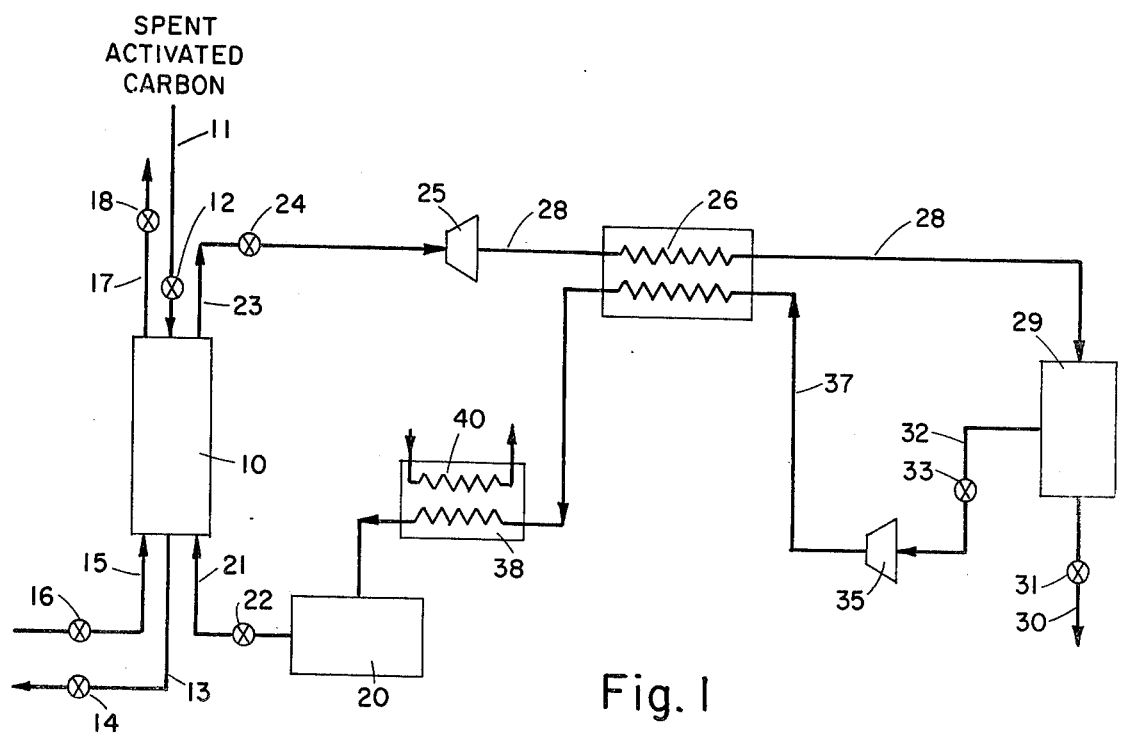
FIG. 1 is a flow diagram illustrating one embodiment of the process and apparatus for regenerating adsorbents according to this invention.

It is a well-known phenomenon that when certain gases are subjected to a specified pressure and maintained above a certain temperature they reach a supercritical state. Broadly, this supercritical state as the term is used herein may be defined as the region of temperature and pressure above the critical temperature and critical pressure of the compound.

Supercritical fluids have recently been recognized as solvents for a number of different types of materials, among which may be listed aliphatic and aromatic hydrocarbons; organometallics such as metal alkyls and alcoholates, silicones and boroalkyls; organic esters of inorganic acids such as sulfuric and phosphoric; and organosilicons. To be a solvent, the supercritical fluid should be essentially inert to the solvate. Simple experiments can readily be performed to determine the solubility of a compound in a supercritical fluid. Generally, gases of different chemical nature but with similar physical properties should behave similarly as solvents in the supercritical state. (See for example "The Principle of Gas Extraction" by P. F. M. Paul and W. S. Wise, Millsand Boon Ltd., London, 1971).

Supercritical fluids have been used to separate organic mixtures (British Pat. Nos. 1,057,911 and 1,111,422 and French Pat. Nos. 1,512,060 and 1,512,061) and to extract volatiles from coal (U.S. Pat. No. 2,664,390 and U.S. Defensive Publication No. T 861,044).

Among those gases which may be converted to supercritical fluids at temperatures and pressures commonly used industrially are hydrocarbons such as methane, ethane, propane, butane, pentane, hexane, ethylene, and propylene; halogenated hydrocarbons; and inorganics such as carbon dioxide, ammonia, sulfur dioxide, nitrous oxide, hydrogen chloride and hydrogen sulfide. Suitable mixtures of these gases may also be used. In the process of this invention, carbon dioxide has been found to be particularly suitable for removing organic adsorbates from activated carbon. The critical temperature of carbon dioxide is 31° C. and critical pressure is 72.9 atmospheres. Therefore the temperature of its most advantageous condition of use (between 10° and 15° above critical) is not far above ambient temperature. The critical temperatures and pressures for some selected fluids are listed below in Table 1:

Table 1

| Critical Properties for Selected Fluids | | |
|---|---|---|
| Fluid | $T_c$ ° C | $P_c$ Atm |
| $CO_2$ | 31.1 | 72.9 |
| $NH_3$ | 132.3 | 111.3 |
| $H_2O$ | 374.4 | 226.8 |
| Methanol | 240.5 | 78.9 |
| Ethanol | 243.4 | 63.0 |
| Isopropanol | 235.3 | 47.0 |
| Ethane | 32.4 | 48.3 |
| Nitrous oxide | 36.5 | 71.4 |
| n-Propane | 96.8 | 42.0 |
| n-Butane | 152.0 | 37.5 |
| n-Pentane | 196.6 | 33.3 |
| n-Hexane | 234.2 | 29.6 |
| n-Heptane | 267.0 | 27.0 |
| 2,3-Dimethylbutane | 226.8 | 31.0 |
| Benzene | 288.9 | 48.3 |
| Dichlorodifluoromethane | 111.7 | 39.4 |
| Dichlorfluoromethane | 178.5 | 51.0 |
| Trichlorofluoromethane | 196.6 | 41.7 |
| Dichlorotetrafluoroethane | 146.1 | 35.5 |
| Chlorotrifluoromethane | 28.8 | 39.0 |

As previously noted, adsorbents are frequently used to purify fluid streams. Activated charcoal is normally used to remove nonpolar impurities such as hydrocarbons from aqueous liquids or organic vapors from air streams; and alumina, silica and various silicates are normally used to remove polar impurities such as water from organic streams.

The method and apparatus of this invention are illustrated in somewhat diagrammatic form in FIG. 1 using carbon dioxide as the supercritical fluid to remove hydrocarbon impurities adsorbed on activated carbon. In the apparatus of FIG. 1 it will be assumed that spent activated carbon in the form of a free-flowing finely divided particulate material is derived from a spent carbon storage tank (see FIG. 4) and introduced at essentially ambient temperature and pressure into desorption column 10 (serving as fluid contacting means) by way of line 11, the in-flow of spent carbon being controlled by high-pressure on-off valve 12. The desorption column 10 must be constructed to be able to withstand the highest pressure to which the supercritical fluid is raised. Thus for example desorption column 10 may be any suitably designed pressure vessel. Although the process shown in FIG. 1 is a batch process, it is, of course, within the scope of this invention to use a continuous process if desired. In such a batch process as this the spent carbon is charged to desorption column 10 in batches, followed by pressurization and then desorption by the circulation of supercritical fluid therethrough.

Desorption column 10 also has a regenerated activated carbon discharge line 13 with high-pressure valve 14; and a gas purge inlet line 15 with high-pressure valve 16 and gas purge discharge line 17 with high-pressure valve 18.

The supercritical fluid for regeneration, e.g., carbon dioxide at 300 atmospheres pressure and 35° C., is stored in a storage tank 20 and is periodically introduced into desorption column 10 through high-pressure line 21 having a high-pressure fluid flow control valve 22. Subsequent to its contacting the activated carbon adsorbent in column 10, the supercritical fluid having adsorbate, e.g., hydrocarbons, dissolved therein is withdrawn from column 10 through high pressure line 23, the fluid flow through which is controlled by high-pressure on-off valve 24.

In the embodiment of this invention illustrated in FIG. 1, the physical treatment to which the supercritical fluid is subjected to render it a nonsolvent for the adsorbates is that of decreasing its pressure. This is done by expanding the supercritical fluid in a suitable expander, e.g., a turbo expander 25. In this example using carbon dioxide at 300 atmospheres and 35° C., such expansion will typically reduce the pressure to about 80 atmospheres. Such expansion may reduce the temperature as in the case of the example illustrated in FIG. 1. In any event, it may be necessary to adjust the temperature of the fluid so that it has minimum solubility for the adsorbates prior to recycling it. Thus FIG. 1 illustrates heat exchangers 26 and 38 in the fluid lines for effecting temperature adjustments.

The decrease in pressure experienced by the supercritical fluid brought about through expansion in expander 25 and any variation in temperature brought about in heat exchanger 26 renders the supercritical fluid a nonsolvent for the adsorbate. Thus the adsorbate is in effect precipitated out and there results a two-phase fluid which is taken to phase separator 29. This separator may be, for example, a cyclone separator or a holding tank. The adsorbate is withdrawn from phase separator 29 through adsorbate drawoff line 30 having valve 31 and the supercritical fluid is discharged from the separator 29 through discharge line 32 and valve 33. In the case of this particular example of carbon dioxide, the temperature of the carbon dioxide is raised to about 35° C. in heat exchanger 26. However, since the pressure is only about 80 atmospheres, it is necessary to compress it to restore it to its supercritical condition and render it a solvent for the adsorbate. This is done by compressing it in a compressor 35 which brings it back up to 300 atmospheres pressure and about 95° C. Since this temperature is considerably above the desired 35° C. for supercritical carbon dioxide in this example, the supercritical fluid is used in heat exchanger 26 to heat the fluid discharged from expander 25. Thus the one side of heat exchanger 26 is part of supercritical flow line 37 connecting compressor 35 with storage tank 20. In this example using carbon dioxide, the temperature of the supercritical fluid as it leaves heat exchanger 26 may still be above the desired 35° C. so that a second heat exchanger 38 is provided to effect heat exchange between the supercritical fluid and an externally-supplied coolant, e.g., water, flowing in coils 40. Thus the supercritical fluid reaches storage tank 20 in a solvent condition to be recycled.

Although the supercritical fluid may be used as a solvent for the adsorbates at temperatures and pressures above its supercritical temperature and pressure, it is generally preferable to maintain its temperature no greater than about 50° C. above the supercritical temperature and even more preferable in some cases to maintain its temperature during solvation no greater than about 10° C. above the supercritical temperature. The maximum pressure will be determined by the high-pressure capabilities of the equipment used. Generally, the higher pressures will be preferable to enhance the solubility of the adsorbate. In choosing the physical conditions to render the supercritical fluid a nonsolvent for the adsorbate it will generally be desirable to alter the pressure and/or temperature of the supercritical fluid no more than is necessary to separate out the adsorbate.

Figure 2:
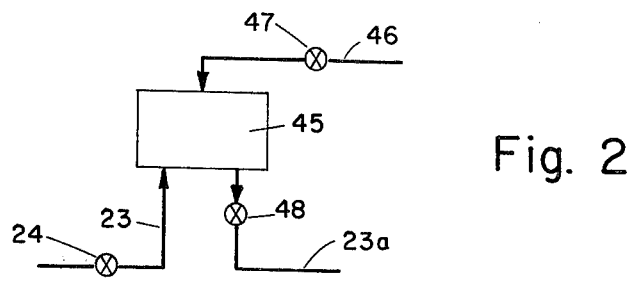
FIG. 2 illustrates in diagrammatic fashion a modification of the process and apparatus of FIG. 1 to include the reaction of the adsorbate with a chemical reactant while dissolved in the supercritical fluid.

It may be desirable in some cases to alter the chemical nature, and hence physical properties, of the adsorbate subsequent to its removal from the adsorbent. This may be done by reacting the adsorbate with a suitable reactant while it is dissolved in or mixed with the supercritical fluid. Thus in FIG. 2, in which the same reference numerals are used to identify the same components of FIG. 1, there is shown a reaction chamber 45 into which a reactant for the adsorbate (e.g., oxygen to react with hydrocarbons) is introduced through line 46 and valve 47. The supercritical fluid is then withdrawn through line 23a, which is an extension of line 23, and valve 48. If, as shown in FIG. 2, the reactant is introduced into the supercritical fluid while it is in its solvent state, then reaction chamber 45 and all the lines and valves in them must be capable of handling high pressures. Alternatively, the reaction chamber may be associated with line 28 in the same manner as shown in FIG. 2 for line 23 such that the reaction may be carried out in the two-phase system wherein the supercritical fluid is in its nonsolvent state.

Figure 3:
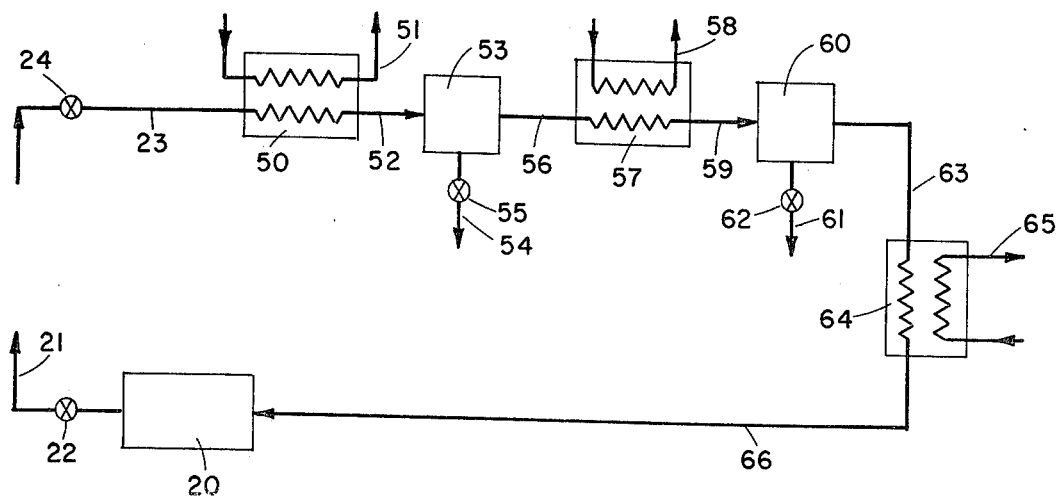
FIG. 3 is a flow diagram illustrating another embodiment of the process and apparatus of this invention.

FIG. 3 illustrates another embodiment of the process and apparatus for treating the supercritical fluid to render it a nonsolvent for the adsorbate and then to reconvert it as a solvent for recycling. In the embodiment of FIG. 3 these treating steps are limited to changing the temperature of the supercritical fluid to effect phase separations and it is assumed for the sake of illustration that the adsorbate constitutes at least two distinct chemical species which exhibit different solubilities in the supercritical fluid. In FIG. 3 like reference numerals refer to like components in FIG. 1.

The apparatus of FIG. 3 provides for a multiple-step separation brought about through two successive increases (or decreases) in temperature. Although two steps are illustrated, any suitable number may be employed. Thus the supercritical fluid containing all of the adsorbate dissolved therein is carried through line 23 into a first heat exchanger 50 where it is heated (or cooled) through indirect heat exchange with an externally-supplied heat transfer fluid in line 51 to a first higher (or lower) temperature which is sufficient to separate out a first fraction of the adsorbate. Thus, in effect, the supercritical fluid is converted to a nonsolvent state for this first fraction of adsorbate but remains in a solvent state for any succeeding fractions of the adsorbate. Through line 52 this first two-phase liquid is taken to a first phase separator 53 from which the first adsorbate fraction is discharged through line 54 and valve 55. Then the supercritical fluid containing the second adsorbate fraction dissolved therein is directed through line 56 into a second heat exchanger 57 where it is heated (or cooled) further by an externally-supplied heat transfer fluid in line 58. This heating separates out the second adsorbate fraction and the resulting two-phase fluid is carried by line 59 into a second phase separator 60 from which the second adsorbate fraction is discharged through line 61 and valve 62. The high-temperature supercritical fluid is taken by line 63 to a heat exchanger 64 where it is cooled (or heated) by indirect heat exchange with a coolant (or heating fluid) externally supplied through line 65. The supercritical fluid at the desired temperature and pressure (i.e., in the solvent state for all adsorbates) is then transferred through line 66 to storage tank 20.

The use of temperature alone to render the supercritical fluid a nonsolvent for the adsorbate requires that high-pressure equipment be used throughout. Thus the embodiment of FIG. 3 is more desirable in those cases where supercritical pressures are relatively low and where the solubility of the adsorbate is realtively sensitive to temperature.

It is, of course, within the scope of this invention to eliminate the second heat transfer step shown in FIG. 3 and perform only one separation step through changing the temperature. It is also within the scope of this invention to carry out the depressurizing of the supercritical fluid as shown in FIG. 1 in more than one stage, thus effecting the separation of more than one adsorbate. It is also within the scope of this invention to incorporate a reaction step as illustrated in FIG. 2 into the process of FIG. 3.

Figure 4:
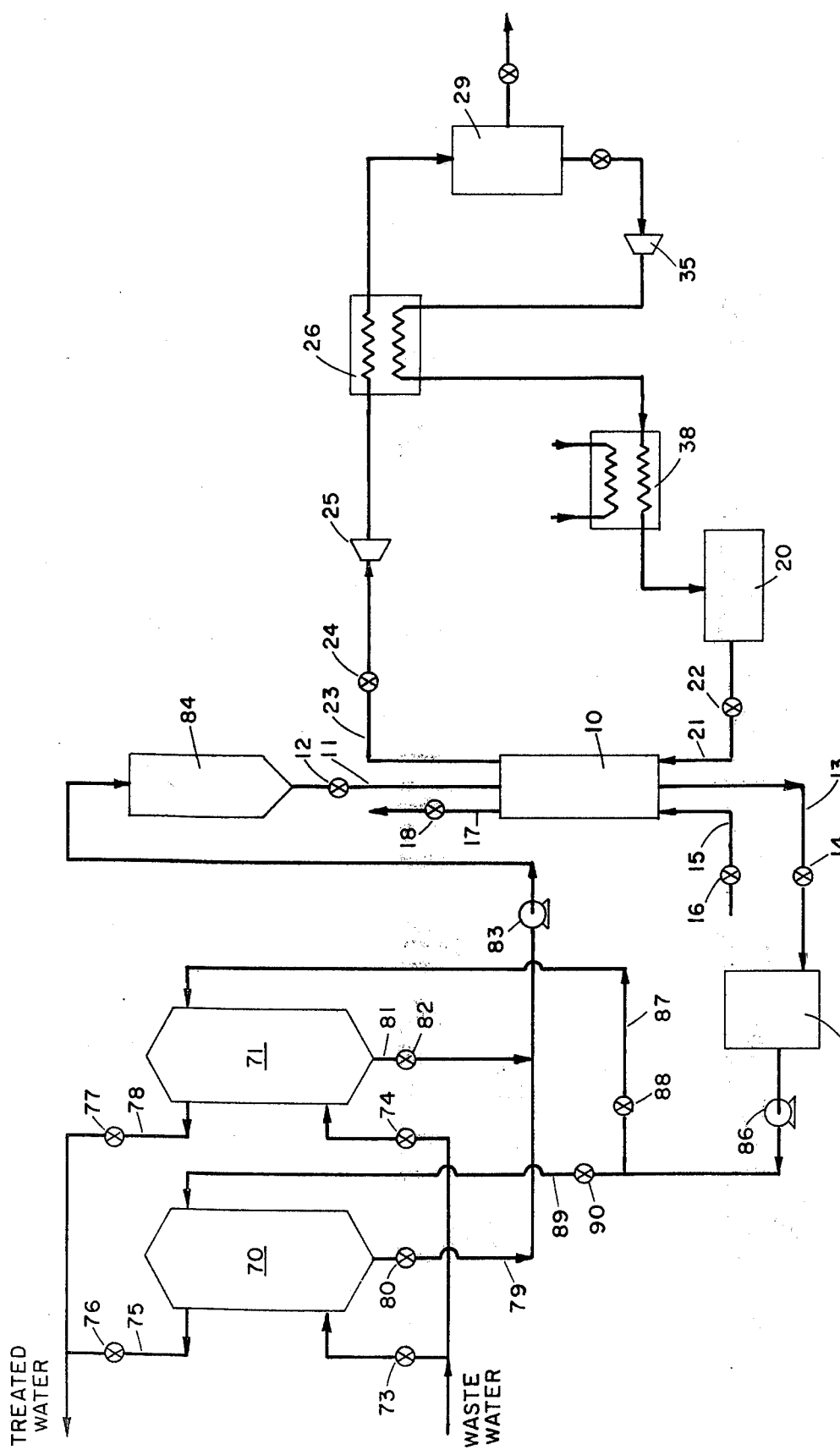
FIG. 4 is a flow diagram of a waste water clean-up system incorporating the process and apparatus of this invention for regenerating an activated carbon adsorbent used therein.

The incorporation of the adsorbent regeneration process and apparatus of this invention into a waste water purification system is illustrated diagrammatically in FIG. 4. The apparatus of FIG. 1 is employed; and since like numerals have been used to describe like components the description of the circulation of the supercritical fluid need not be repeated.

FIG. 4 illustrates the use of two alternating adsorption columns 70 and 71 which are cycled so that while one is in use the other may be regenerated. This is, of course, well-known arrangement and any suitable number of adsorbent columns may be used in parallel as well as in series. The waste water to be purified is introduced through line 72 into column 70 or 71, depending upon whether valve 73 or 74 is open. Assume that column 70 is on stream, valve 73 will be open and valve 74 closed. Column 70 is packed with an adsorbent, e.g. activated carbon, to adsorb impurities and the treated water is discharged through line 75 and valve 76. Since column 71 is off stream and is being readied for use, valve 77 in water discharge line 78 is closed. Under these conditions, spent carbon line 79 and its associated valve 80 of column 70 are closed; while spent carbon line 81 and its associated valve 82 of column 71 are open to enable pump 83 to transfer spent carbon with its adsorbate adhered to its surface to the spent carbon drain and feed tank 84 from where it is introduced periodically into contacting column 10 for regeneration as described above in conjunction with the discussion of FIG. 1. Slurry pumps or water eductors to function as pump 83 are well known.

Prior to the extraction of adsorbate from the adsorbent in contacting column 10, valves 22 and 24 are closed and valves 16 and 18 are opened to permit a drying gas, e.g., hot air, to pass over the spent carbon to remove residual water. Then carbon dioxide at atmospheric pressure is passed up through the dried spent carbon to remove any moisture remaining in the pores of the spent carbon. Valves 16 and 18 are then closed and valves 22 and 24 are opened; and regeneration is effected as previously described. Then with valves 12, 22, 23, 16 and 18 closed, valve 14 is opened and the regenerated activated carbon is transferred by line 13 into carbon storage tank 85 from with it may be transferred by pump 86 into the off stream column 71. Thus the regenerated adsorbent is taken through line 87, controlled by valve 88, into column 71; and when column 70 is off stream the regenerated adsorbent is introduced into it through line 89, controlled by valve 90.

The following example which is meant to be illustrative only, and not limiting, may be cited to show the effective removal of phenol adsorbed on activated carbon. A one weight percent aqueous solution of phenol at 55.5° C. was flowed through a bed of activated carbon until a breakover point, indicated by the presence of phenol in the liquid coming off the carbon, was reached. Thus the full capability of the activated carbon to adsorb the phenol had been attained. Then the carbon with the phenol adsorbed on it was contacted with supercritical carbon dioxide at 55.5° C. and 170 atmospheres. The presence of phenol in the carbon dioxide was detected through ultraviolet detection means. The resulting reactivated carbon was again contacted with additional aqueous phenol solution and adsorbed about 70% as much phenol as originally. Thus the supercritical carbon dioxide had in effect removed about 70% of the phenol adsorbed on the activated carbon.

By using a supercritical fluid to dissolve off the adsorbates from the adsorbent, the adsorbent is not subjected to any appreciable thermal or chemical degradation. Moreover, it is possible to use such supercritical fluids as carbon dioxide, ethane or ethylene which require temperatures and pressures well within the capabilities of existing equipment. Finally, these fluids (and particularly carbon dioxide) are inexpensive, a fact which contributes materially to the economics of industrial processes and waste water purification.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. A process for regenerating an adsorbent by extracting adsorbate therefrom, comprising the steps of
   (a) contacting with a supercritical fluid an adsorbent with adsorbate adsorbed thereon from a solution of said adsorbate, said supercritical fluid being a solvent for said adsorbate thereby to desorb a substantial amount of said adsorbate and to dissolve it in said supercritical fluid, the temperature of said supercritical fluid during said contacting being no greater than about 50° C. above its critical temperature and the pressure being above its critical pressure;
   (b) separating said supercritical fluid with said dissolved adsorbate from said adsorbent, thereby to render said adsorbent capable of adsorbing an additional quantity of said adsorbate;
   (c) subjecting said supercritical fluid containing said adsorbate dissolved therein to physical treatment which renders said fluid a nonsolvent for said adsorbate thereby to form a two-phase system comprising said fluid in a nonsolvent state and said adsorbate;
   (d) separating the resulting two-phase system into nonsolvent state fluid and adsorbate; and
   (e) subjecting said nonsolvent state fluid subsequent to said separating step to a physical treatment which converts it to a solvent state supercritical fluid making it a solvent for said adsorbate.

2. A process in accordance with claim 1 wherein said adsorbent is activated carbon.

3. A process in accordance with claim 1 wherein said supercritical fluid is carbon dioxide.

4. A process in accordance with claim 1 wherein said adsorbent is activated carbon and said supercritical fluid is carbon dioxide.

5. A process in accordance with claim 1 wherein said adsorbate comprises organic impurities from waste water treatment.

6. A process in accordance with claim 1 wherein said physical treatment of step (c) comprises decreasing the pressure of said supercritical fluid.

7. A process in accordance with claim 6 wherein said physical treatment of step (e) comprises compressing said nonsolvent state fluid to a pressure above its critical pressure.

8. A process in accordance with claim 6 wherein said decreasing of said pressure is accomplished by expansion accompanied by a concomitant decreasing of the temperature of said supercritical fluid.

9. A process in accordance with claim 8 wherein said physical treatment of step (e) comprises compressing said nonsolvent state fluid thereby to heat said fluid and to raise it to a pressure above its critical pressure and effecting indirect heat exchange between said nonsolvent state fluid and the resulting compressed fluid thereby to decrease the temperature of said compressed fluid and to form said solvent state supercritical fluid.

10. A process in accordance with claim 1 wherein said physical treatment of step (c) comprises changing the temperature of said supercritical fluid in one direction and said physical treatment of step (e) comprises changing the temperature of said nonsolvent state supercritical fluid in a direction opposite to that of step (c).

11. A process in accordance with claim 1 wherein the physical treatment of step (c) and the separating of step (d) are carried out in stages thereby to effect the separation of more than one fraction of said adsorbate.

12. A process in accordance with claim 1 including the step of chemically reacting said adsorbate with a reactant subsequent to executing step (c).

13. In a process for treating waste water in which at least one organic impurity is adsorbed on an adsorbent from said waste water and said adsorbent is periodically regenerated by removing said impurity therefrom, the improvement comprising regenerating said adsorbent by contacting said adsorbent having said impurity adsorbed thereon with a supercritical fluid which is a solvent for said impurity thereby to desorb a substantial amount of said impurity and to dissolve said impurity in said supercritical fluid and to render said adsorbent capable of again adsorbing said impurity from waste water.

14. A process in accordance with claim 13 wherein said adsorbent is activated carbon.

15. A process in accordance with claim 13 wherein said supercritical fluid is carbon dioxide.

16. A process in accordance with claim 13 wherein said adsorbent is activated carbon and said supercritical fluid is carbon dioxide.

17. A process in accordance with claim 13 including the step of chemically reacting said adsorbate dissolved in said supercritical fluid with a reactant introduced into said supercritical fluid.

18. A process in accordance with claim 17 wherein said supercritical fluid is carbon dioxide and said reacting comprises oxidizing said organic impurity by introducing a source of oxygen into said supercritical carbon dioxide.

19. In a process for treating waste water in which at least one organic impurity is adsorbed on activated carbon from said waste water and said carbon is periodically regenerated by removing said impurity therefrom, the improvement comprising regenerating said carbon by
   (a) contacting said carbon with said impurity adsorbed thereon with a supercritical fluid which is a solvent for said impurity thereby to desorb said impurity and dissolve it in said supercritical fluid;
   (b) separating said supercritical fluid with said dissolved impurity from said adsorbent, thereby to remove a substantial amount of said impurity from said carbon and render said carbon capable of adsorbing an additional quantity of said impurity;
   (c) subjecting said supercritical fluid containing said impurity dissolved therein to physical treatment which renders said fluid a nonsolvent for said impurity, thereby to form a two-phase system comprising said fluid in a nonsolvent state and said impurity;
   (d) separating the resulting two-phase system into nonsolvent state fluid and impurity; and
   (e) subjecting said nonsolvent state fluid subsequent to said separating step to a physical treatment which converts it to a solvent state supercritical fluid making it a solvent for said impurity.

20. A process in accordance with claim 19 wherein said supercritical fluid in said solvent state is carbon dioxide having a temperature no greater than 50° C. above its critical temperature and under a pressure greater than 72.9 atmospheres.

21. A process in accordance with claim 20 wherein said physical treatment of step (c) comprises expanding said supercritical carbon dioxide to a pressure above that level at which it becomes a nonsolvent for said impurity while concomitantly increasing its temperature; and said physical treatment of step (e) comprises compressing said carbon dioxide to above about 73 atmospheres and reducing its temperature to within no greater than 50° C. above its critical temperature.

22. A process for removing an adsorbate from an adsorbent subsequent to the adsorption of said adsorbate on said adsorbent from a solution of said adsorbate, characterized by contacting said adsorbent with said adsorbate adsorbed thereon with carbon dioxide in a supercritical state thereby to desorb a substantial amount of said adsorbate and to dissolve it in said supercritical carbon dioxide whereby said adsorbent is rendered capable of adsorbing an additional quantity of said adsorbate, said supercritical carbon dioxide during said contacting being at a temperature which is no greater than 50° C. above its critical temperature and at a pressure above its critical pressure.

23. A process in accordance with claim 22 wherein said adsorbent is activated carbon.

24. A process in accordance with claim 22 wherein said adsorbate is an organic.

* * * * *